(12) United States Patent
Asakawa et al.

(10) Patent No.: US 12,533,732 B2
(45) Date of Patent: Jan. 27, 2026

(54) CUTTING TOOL (71) Applicant: SUMITOMO ELECTRIC HARDMETAL CORP., Itami (JP)

(72) Inventors: Yoshiki Asakawa, Itami (JP); Daiji Tabayashi, Itami (JP); Yusuke Matsuda, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 0 days.

(21) Appl. No.: 19/101,596

(22) PCT Filed: Apr. 16, 2024

(86) PCT No.: PCT/JP2024/015171
§ 371 (c)(1),
(2) Date: Feb. 6, 2025

(87) PCT Pub. No.: WO2025/220130
PCT Pub. Date: Oct. 23, 2025

(65) Prior Publication Data
US 2025/0319522 A1 Oct. 16, 2025

(51) Int. Cl.
*B23B 27/14* (2006.01)
*B23B 51/00* (2006.01)
(Continued)

(52) U.S. Cl.
CPC ............ *B23B 27/148* (2013.01); *C23C 14/16* (2013.01); *C23C 14/3485* (2013.01); *C23C 14/35* (2013.01); *B23B 2228/105* (2013.01)

(58) Field of Classification Search
None
See application file for complete search history.

(56) References Cited

U.S. PATENT DOCUMENTS

2014/0338512 A1* 11/2014 Suzuki .................... B23B 27/14
83/651
2019/0276922 A1* 9/2019 Takahama ............ C10M 171/02
(Continued)

FOREIGN PATENT DOCUMENTS

JP 2007144565 A * 6/2007
JP 6699056 B2 5/2020
(Continued)

OTHER PUBLICATIONS

Written Opinion mailed on Jul. 16, 2024, received for International Application PCT/JP2024/015171, filed on Apr. 16, 2024, 6 pages including English Translation.

*Primary Examiner* — Tae H Yoon
(74) *Attorney, Agent, or Firm* — XSENSUS LLP (57) ABSTRACT

A cutting tool comprising a rake face and a flank face, the cutting tool being composed of a substrate and a coating provided on the substrate, the coating including a MAlN layer, the MAlN layer including crystal grains of $M_xAl_{1-x}N$ in the cubic crystal system, in the $M_xAl_{1-x}N$, a metal element M having an atomic ratio x of 0.2 or more and 0.8 or less, in the MAlN layer, M representing a metal element including titanium, chromium, or both, $n_R$ being 3 or less, where $n_R$ represents a number of voids at the rake face in the MAlN layer per 50 μm in length in a cross section of the MAlN layer obtained when the MAlN layer is cut along a plane including a normal to the rake face, the void having an area in cross section of $1.0 \times 10^{-4}$ μm² or more and 0.5 μm² or less.

11 Claims, 6 Drawing Sheets

(51) Int. Cl.
*B23C 5/16* (2006.01)
*C23C 14/16* (2006.01)
*C23C 14/34* (2006.01)
*C23C 14/35* (2006.01)

(56) References Cited

U.S. PATENT DOCUMENTS

2021/0213539 A1  7/2021  Lida et al.
2022/0134445 A1  5/2022  Ri et al.

FOREIGN PATENT DOCUMENTS

WO      2020/175459 A1    9/2020
WO      2021/024737 A1    2/2021
WO   WO 2022/230182 A1 * 11/2022

* cited by examiner

CUTTING TOOL

CROSS-REFERENCE TO RELATED APPLICATION

This application is a national stage application, pursuant to 35 U.S.C. § 371, of International Patent Application No. PCT/JP2024/015171, filed Apr. 16, 2024, the entire contents of which are incorporated herein by reference.

TECHNICAL FIELD

The present disclosure relates to a cutting tool.

BACKGROUND ART

Cubic boron nitride (hereinafter also referred to as "cBN") has a hardness second to that of diamond, and is also excellent in thermal stability and chemical stability. In addition, cBN is more stable for iron-based materials than diamond is, and a cBN sintered material has been used as cutting tools for processing iron-based materials.

Further, in order to enhance a cutting tool made of a cBN sintered material in wear resistance and the like, it has been studied to provide a coating on a substrate of the cBN sintered material.

CITATION LIST

Patent Literature

PTL 1: WO 2021/024737
PTL 2: WO 2022/230182

SUMMARY OF INVENTION

The presently disclosed cutting tool is
a cutting tool comprising a rake face and a flank face,
the cutting tool being composed of a substrate and a coating provided on the substrate,
the coating including a MAlN layer,
the MAlN layer including crystal grains of $M_xAl_{1-x}N$ in the cubic crystal system,
in the $M_xAl_{1-x}N$, a metal element M having an atomic ratio x of 0.2 or more and 0.8 or less,
in the MAlN layer, M representing a metal element including titanium, chromium, or both,
$n_R$ being 3 or less, where $n_R$ represents a number of voids at the rake face in the MAlN layer per 50 μm in length in a cross section of the MAlN layer obtained when the MAlN layer is cut along a plane including a normal to the rake face,
the void having an area in cross section of $1.0 \times 10^{-4}$ μm$^2$ or more and 0.5 μm$^2$ or less.

DETAILED DESCRIPTION

Problem to be Solved by the Present Disclosure

For example, WO2021/024737 (PTL 1) discloses
a cutting tool comprising a rake face and a flank face,
the cutting tool being composed of a substrate made of a cubic boron nitride sintered material and a coating provided on the substrate,
the cubic boron nitride sintered material including cubic boron nitride,
the coating including a MAlN layer,
in the MAlN layer, M representing a metal element including titanium, chromium, or both,
the MAlN layer including crystal grains of $M_xAl_{1-x}N$ in the cubic crystal system,
in the $M_xAl_{1-x}N$, a metal element M having an atomic ratio x of 0.3 or more and 0.7 or less,
the cubic boron nitride being contained at a ratio of 20% by volume or more with respect to the cubic boron nitride sintered material,
$n_F < n_R$ being satisfied, where $n_F$ represents a number of voids at the flank face in the MAlN layer per 100 μm in length in a cross section of the MAlN layer obtained when the MAlN layer is cut along a plane including a normal to the flank face, and $n_R$ represents a number of voids at the rake face in the MAlN layer per 100 μm in length in a cross section of the MAlN layer obtained when the MAlN layer is cut along a plane including a normal to the rake face,
$n_D$ being 3 or less, where $n_D$ represents a number of droplets at the flank face in the MAlN layer per 100 μm in length in a cross section of the MAlN layer obtained when the MAlN layer is cut along a plane including a normal to the flank face.

Furthermore, WO2022/230182 (PTL 2) discloses
a cutting tool comprising a rake face and a flank face,
the cutting tool being composed of a substrate and a coating provided on the substrate,
the coating including a TiMAlN layer,
the TiMAlN layer including crystal grains of $Ti_xM_yAl_zN$ in the cubic crystal system,
in the $Ti_xM_yAl_zN$, the element of titanium having an atomic ratio x of 0.4 or more and 0.79 or less,
in the $Ti_xM_yAl_zN$, the element M having an atomic ratio y of 0.01 or more and 0.1 or less,
in the $Ti_xM_yAl_zN$, the element of aluminum having an atomic ratio z of 0.2 or more and 0.5 or less,
a sum of x, y and z being 1,
the element M being at least one of boron and silicon, or both,
$n_F < n_R$ being satisfied, where $n_F$ represents a number of voids at the flank face in the TiMAlN layer per 100 μm in length in a cross section of the TiMAlN layer obtained by cutting the TiMAlN layer along a plane including a normal to the flank face, and $n_R$ represents a number of voids at the rake face in the TiMAlN layer per 100 µm in length in a cross section of the TiMAlN layer obtained by cutting the TiMAlN layer along a plane including a normal to the rake face, $n_D$ being 3 or less, where $n_D$ represents a number of droplets at the flank face in the TiMAlN layer per 100 µm in length in a cross section of the TiMAlN layer obtained by cutting the TiMAlN layer along a plane including a normal to the flank face.

However, the MAlN layer or the TiMAlN layer of the cutting tools of PTL 1 or 2 has small voids uncounted in these PTLs, and the coating and the substrate may be broken due to the small voids during a cutting process. Therefore, when the layer is applied to a highly efficient cutting process (e.g., a cutting process with a high feed rate) the layer requires further improvement in performance (e.g., breaking resistance).

The present disclosure has been made in view of the above circumstances, and an object thereof is to provide a cutting tool excellent in breaking resistance.

Advantageous Effect of the Present Disclosure

According to the present disclosure, a cutting tool excellent in breaking resistance can be provided.

Overview of Embodiments

Initially, embodiments of the present disclosure will be listed and described.

[1] The presently disclosed cutting tool is
a cutting tool comprising a rake face and a flank face,
the cutting tool being composed of a substrate and a coating provided on the substrate,
the coating including a MAlN layer,
the MAlN layer including crystal grains of $M_xAl_{1-x}N$ in the cubic crystal system.
in the $M_xAl_{1-x}N$, a metal element M having an atomic ratio x of 0.2 or more and 0.8 or less,
in the MAlN layer, M representing a metal element including titanium, chromium, or both,
$n_R$ being 3 or less, where $n_R$ represents a number of voids at the rake face in the MAlN layer per 50 µm in length in a cross section of the MAlN layer obtained when the MAlN layer is cut along a plane including a normal to the rake face,
the void having an area in cross section of $1.0 \times 10^{-4}$ µm$^2$ or more and 0.5 µm$^2$ or less.

Number $n_R$ of voids at the rake face in the MAlN layer per 50 µm in length that is 3 or less allows the cutting tool to be excellent in breaking resistance. Note that herein "breaking resistance" means resistance against breaking of the MAlN layer off the substrate.

[2] $n_F$ may be 3 or less where $n_F$ represents a number of voids at the flank face in the MAlN layer per 50 µm in length in a cross section of the MAlN layer obtained when the MAlN layer is cut along a plane including a normal to the flank face. Such a definition allows the cutting tool to be excellent in wear resistance in addition to breaking resistance. Note that herein "wear resistance" means resistance against wear of the MAlN layer during a cutting process.

[3] The cutting tool further comprises a cutting edge face connecting the rake face and the flank face together, and
$n_C$ may be 3 or less where $n_C$ represents a number of voids at the cutting edge face in the MAlN layer per 50 µm in length in a cross section of the MAlN layer obtained when the MAlN layer is cut along a plane including a normal to the cutting edge face. Such a definition allows the cutting tool to be further excellent in breaking resistance.

[4] The $n_F$ may be 3 or less, the $n_R$ may be 3 or less, and the $n_C$ may be 3 or less. Such a definition allows the cutting tool to be excellent in wear resistance in addition to breaking resistance.

[5] The metal element M may further include at least one element selected from the group consisting of boron, silicon, vanadium, zirconium, niobium, molybdenum, hafnium, tantalum, and tungsten. Such a definition allows the cutting tool to be further excellent in breaking resistance, and in addition, in heat resistance and lubricity.

[6] The substrate may include at least one type selected from the group consisting of a cemented carbide, a cermet, a high-speed steel, a ceramic, a cubic boron nitride sintered material, and a diamond sintered material. Such a definition allows the cutting tool to be excellent in versatility for processing conditions.

[7] The substrate may have a surface roughness $R_{max}$ of 1 µm or less. Such a definition allows the cutting tool to be further excellent in breaking resistance.

[8] The coating may further include an underlying layer provided between the substrate and the MAlN layer, and the underlying layer may be different in composition from the MAlN layer. Such a definition allows the cutting tool to be excellent in versatility for processing conditions.

[9] The coating may further include a surface layer provided on the MAlN layer, and the surface layer may be different in composition from the MAlN layer. Such a definition allows the cutting tool to be excellent in versatility for processing conditions and visibility for a used cutting edge.

[10] the MAlN layer may have a thickness of 0.1 µm or more and 2.0 µm or less. Such a definition allows the cutting tool to be further excellent in breaking resistance.

[11] The coating may have a thickness of 0.1 µm or more and 2.5 µm or less. Such a definition allows the cutting tool to be further excellent in breaking resistance.

Description of Embodiments

Hereinafter, an embodiment of the present disclosure (hereinafter also referred to as "the present embodiment") will be described. It should be noted, however, that the present embodiment is not exclusive. In the present specification, an expression in the form of "A to Z" means a range's upper and lower limits (that is, A or more and Z or less), and when A is not accompanied by any unit and Z is alone accompanied by a unit, A has the same unit as Z. Further, in the present specification, when a compound is represented by a chemical formula with its constituent elements' compositional ratio unspecified, such as "TiN," the chemical formula shall encompass any conventionally known compositional ratio (or elemental ratio). The chemical formula shall include not only a stoichiometric composition but also a nonstoichiometric composition. For example, the chemical formula of "TiN" includes not only a stoichiometric composition of "Ti$_1$N$_1$" but also a non-stoichiometric composition for example of "Ti$_1$N$_{0.8}$." This also applies to descriptions for compounds other than "TiN."

<<Surface-Coated Cutting Tool>>

The presently disclosed cutting tool is
a cutting tool comprising a rake face and a flank face,
the cutting tool being composed of a substrate and a coating provided on the substrate,
the coating including a MAlN layer,
the MAlN layer including crystal grains of $M_xAl_{1-x}N$ in the cubic crystal system,
in the $M_xAl_{1-x}N$, a metal element M having an atomic ratio x of 0.2 or more and 0.8 or less,
in the MAlN layer, M representing a metal element including titanium, chromium, or both,
$n_R$ being 3 or less, where $n_R$ represents a number of voids at the rake face in the MAlN layer per 50 μm in length in a cross section of the MAlN layer obtained when the MAlN layer is cut along a plane including a normal to the rake face,
the void having an area in cross section of $1.0 \times 10^{-4}$ μm$^2$ or more and 0.5 μm$^2$ or less.

The surface coated cutting tool according to the present embodiment (hereinafter also simply referred to as a "cutting tool") can for example be a drill, an end mill, an indexable cutting insert for a drill, an indexable cutting insert for an end mill, an indexable cutting insert for milling, an indexable cutting insert for turning, a metal saw, a gear cutting tool, a reamer, a tap, or the like.

Figure 1:
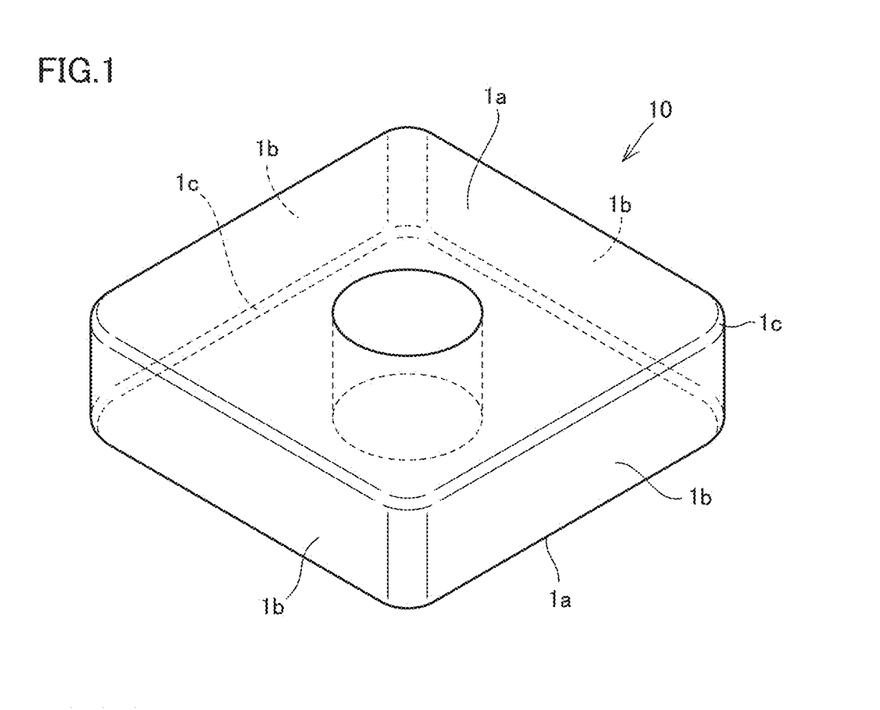
FIG. 1 is a perspective view of a cutting tool in one manner.

FIG. 1 is a perspective view of a cutting tool in one manner. A cutting tool 10 having such a shape is used as an indexable cutting insert for turning.

Cutting tool 10 shown in FIG. 1 has a surface including a top surface, a bottom surface, and four side surfaces, and is generally in the form of a quadrangular prism which is more or less smaller in thickness in the vertical direction. Further, cutting tool 10 has a throughhole penetrating it through the top and bottom surfaces, and the four side surfaces at their boundary portions have adjacent ones thereof connected by an arcuate surface.

Cutting tool 10 normally has the top and bottom surfaces to form a rake face 1a, the four side surfaces (and each arcuate surface connecting adjacent ones thereof together) to form a flank face 1b, and a surface connecting rake face 1a and flank face 1b together to form a cutting edge face 1c. A "rake face" means a face ejecting chips produced from a workpiece as it is cut. A "flank face" means a face partially brought into contact with the workpiece. The cutting edge face is included in a portion configuring the cutting edge of the cutting tool.

When the cutting tool is an indexable cutting insert, cutting tool 10 also includes a shape with or without a chip breaker. While FIG. 1 shows the cutting tool having a cutting edge shaped to be a flat surface (i.e., cutting edge face 1c), the cutting edge's shape is not limited thereto. That is, the cutting edge has a shape including that of a sharp edge (that is, a ridge formed by the rake face and the flank face) (see FIG. 3 for example) and that of a negative land (that is, a chamfered shape) (see FIG. 2 for example).

While the shape of cutting tool 10 and the name of each part thereof have been described with reference to FIG. 1, similar terminology will be used to indicate a shape of the substrate of the cutting tool according to the present embodiment and the name of each part thereof that correspond to those of cutting tool 10. That is, the substrate of the cutting tool has a rake face and a flank face. The substrate may have a cutting edge face connecting the rake face and the flank face together.

Figure 4:
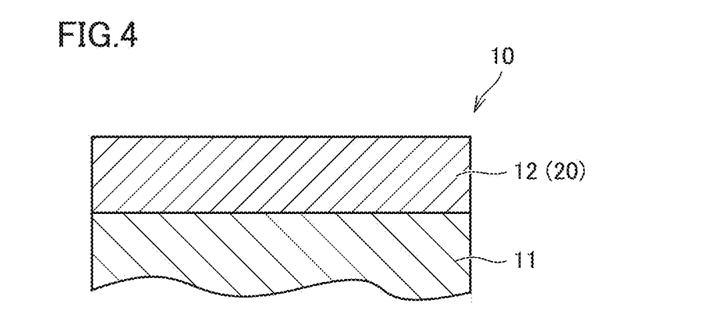
FIG. 4 is a schematic cross section of a cutting tool according to the present embodiment in still another manner.

Cutting tool 10 comprises a substrate 11 and an MAlN layer 12 provided on substrate 11 (see FIG. 4). In addition to MAlN layer 12, cutting tool 10 may further include an underlying layer 13 provided between substrate 11 and MAlN layer 12 (see FIG. 5). Cutting tool 10 may further include a surface layer 14 provided on MAlN layer 12 (see FIG. 5). Other layers such as underlying layer 13 and surface layer 14 will be described hereinafter.

Figure 2:
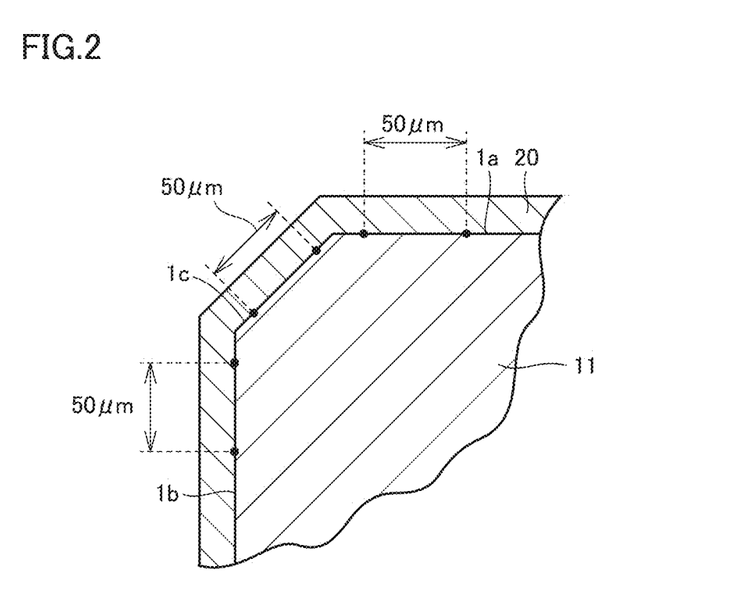
FIG. 2 is a schematic cross section of a cutting tool according to the present embodiment in one manner.
Figure 3:
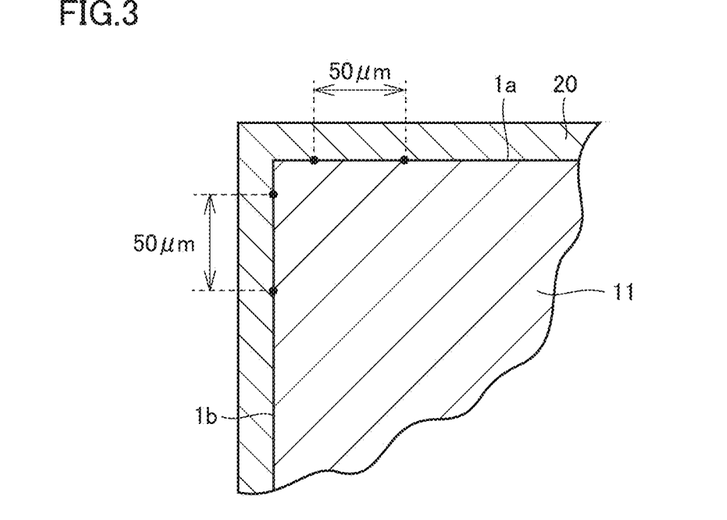
FIG. 3 is a schematic cross section of a cutting tool according to the present embodiment in another manner.
Figure 5:
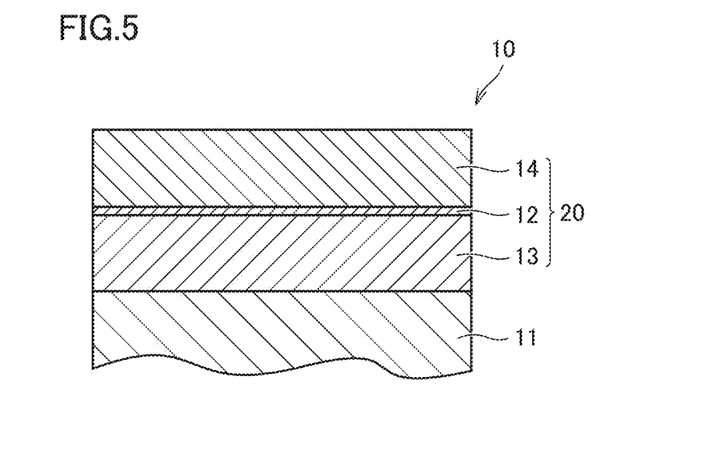
FIG. 5 is a schematic cross section of a cutting tool according to the present embodiment in still another manner.

The above-described layers provided on the substrate may be collectively referred to as a "coating." That is, cutting tool 10 comprises a coating 20 coating substrate 11 (see FIGS. 2 and 3). Coating 20 includes MAlN layer 12 (see FIG. 4). Further, coating 20 may further include underlying layer 13 or surface layer 14 (FIG. 5).

<Substrate>

The substrate of the present embodiment may be any substrate conventionally known as this type of substrate. For example, the substrate may include at least one type selected from the group consisting of a cemented carbide (for example, a tungsten carbide (WC)-based cemented carbide, a cemented carbide containing Co in addition to WC, a cemented carbide to which a carbonitride such as Cr, Ti, Ta, Nb, or the like is added in addition to WC), a cermet (having TiC, TiN, TiCN, or the like as a main component), a high-speed steel, a ceramic (titanium carbide, silicon carbide, silicon nitride, aluminum nitride, aluminum oxide and the like), a cubic boron nitride sintered material (a cBN sintered material), and a diamond sintered material.

Among these various types of substrates, inter alia, a cemented carbide (a WC-based cemented carbide, in particular), a cermet (a TiCN-based cermet, in particular), and a cubic boron nitride sintered material may be selected. This is because these substrates have an excellent balance between hardness and strength at high temperature, in particular, and have an excellent property as a substrate for a cutting tool for the above-described application.

If the substrate is formed using a cemented carbide having a structure including free carbon or an extraordinary phase called a η phase, the present embodiment is still effective. The substrate used in the present embodiment may have its surface modified. For example, a substrate of a cemented carbide may have a surface with a β-free layer formed thereon, and a substrate of a cBN sintered material may have a surface hardened layer, and if the substrate thus has a modified surface, the present embodiment is still effective.

The substrate's surface roughness $R_{max}$ may be 1 μm or less, and may be 0.5 μm or less. While a lower limit value for the surface roughness $R_{max}$ for the substrate is not particularly limited, it may be, for example, 0.1 μm or more. The surface roughness conforms to JIS B06012001, and can for example be measured using a contact-type surface roughness tester with a cut-off value of 0.3 mm, a sampling length of 0.8 mm, and a scanning rate of 0.06 mm/sec.

(Cubic Boron Nitride Sintered Material)

In one aspect the present embodiment, the substrate may be a cubic boron nitride (cBN) sintered material. The cubic boron nitride sintered material includes cubic boron nitride. In one aspect of the present embodiment, the cubic boron nitride sintered material may further include a binder.

(Cubic Boron Nitride)

In the present embodiment, "cubic boron nitride" means crystal grains of cubic boron nitride in the cubic crystal system. That is, the cubic boron nitride sintered material includes polycrystalline cubic boron nitride.

The cubic boron nitride may be contained relative to the cubic boron nitride sintered material at a ratio of 20% by volume or more, 20% by volume or more and 97% by volume or less, or 20% by volume or more and 80% by volume or less. The ratio of the cubic boron nitride contained relative to the cubic boron nitride sintered material (in % by volume) and a ratio of a binder (a binder phase) contained relative thereto, as will be described hereinafter, can be confirmed by subjecting the cubic boron nitride sintered material to structure observation, element analysis, and the like using an energy dispersive X-ray analyzer (EDX) "Octane Elect EDS System®", an accessory to a scanning electron microscope (SEM) ("JSM-7800F®" manufactured by JEOL).

Specifically, a ratio (% by volume) of cubic boron nitride contained can be determined as follows. Initially, any portion of the cubic boron nitride sintered material is cot to prepare a sample including a cross section of the cubic boron nitride sintered material. A focused ion beam device, a cross section polisher, or the like can be used to obtain the cross section. Subsequently, the cross section is observed with an SEM at a magnification of 5,000 times to obtain a backscattered electron image. The backscattered electron image shows grains of cubic boron nitride in black for a dark field), and a region in which the binder is present in gray or white (or a bright field).

Subsequently, the backscattered electron image is binarized using image analysis software (for example, "WinROOF" of Mitani Corporation). From the binarized image, a ratio in area of pixels derived from the dark field (or pixels derived from cubic boron nitride) to the area of the field of view for measurement is calculated. The calculated ratio in area can be considered as a % in volume to obtain a ratio of cubic boron nitride contained (in % by volume).

While the ratio obtained in the above-described method is a ratio in area of cubic boron nitride in a field of view, in the present embodiment the ratio in area is regarded as a ratio in volume and thus handled. That is, when the cubic boron nitride has a ratio in area of 20% as determined in the above method, the cubic boron nitride will be regarded as being contained at a ratio of 20% by volume with respect to the cubic boron nitride sintered material.

The cubic boron nitride's median diameter $D_{50}$ may be 0.1 µm or more and 5 µm or less, and may be 0.2 µm or more and 3 µm or less.

The cubic boron nitride's median diameter $D_{50}$ is determined as follows: Initially, as has been done in determining a ratio of cubic boron nitride contained, a sample including a cross section of the cubic boron nitride sintered material is prepared, and a backscattered electron image thereof is obtained. Subsequently, image analysis software ("WinROOF (ver. 7.4.5)" of Mitani Corporation) is used to calculate an equivalent circle diameter of each dark field (corresponding to cBN) in the backscattered electron image. It is preferable to observe five or more such fields of view to calculate 100 or more cubic boron nitride grains' equivalent circle diameters.

Subsequently, the equivalent circle diameters are arranged in ascending order from the minimum value to the maximum value to obtain a cumulative distribution. A grain size for which a cumulative area of 50% is attained in the cumulative distribution will be $D_{50}$. Note that the equivalent circle diameter means the diameter of a circle having an area equal to that of a cubic boron nitride grain measured.

(Binder)

In the present embodiment, a "binder" means a substance that binds crystal grains of the cubic boron nitride together. The binder may include a compound consisting of: at least one element selected from the group consisting of a group 4 element, a group 5 element and a group 6 element of the periodic table of elements, Al (aluminum), and Si (silicon); and at least one element selected from the group consisting of C (carbon), N (nitrogen), B (boron) and O (oxygen).

Examples of the group 4 element for example include Ti (titanium), Zr (zirconium), and Hf (hafnium). Examples of the group 5 element for example include V (vanadium), Nb (niobium), and Ta (tantalum). Examples of the group 6 element for example include Cr (chromium), Mo (molybdenum), and W (tungsten). The binder's each component can be determined by analyzing a region of a sample of the cutting tool including the above-described cross section that corresponds to the binder through energy dispersive x-ray spectroscopy accompanying an SEM (SEM-EDX). This is done by observing the sample at a magnification for example of 10,000 times.

Examples of the compound consisting of: at least one element selected from the group consisting of a group 4 element, a group 5 element and a group 6 element of the periodic table of elements, Al, and Si; and at least one element selected from the group consisting of C, N, B and O include a nitride such as TiN and AlN, a carbide such as TiC and WC, a boride such as $TiB_2$ and $AlB_2$, an oxide such as $Al_2O_3$ and the like, or TiCN, AlON, SiAlON, SiTiAlON and the like.

(Inevitable Impurities)

The cubic boron nitride sintered material may include inevitable impurities within a range that does not impair an effect that the present disclosure has. Inevitable impurities collectively refer to elements and compounds that may be contained in a trace amount in raw materials for the cubic boron nitride sintered material or in producing it. Elements and compounds contained as inevitable impurities are each contained in an amount (in % by volume) of 0% by volume or more and 5% by volume or less, and a total of these (that is, a total content of trace impurities) may be 0% by volume or more and 5% by volume or less. Therefore, inevitable impurities may or may not be contained in the cubic boron nitride sintered material. Examples of inevitable impurities include Li, Mg, Ca, Sr, Ba, Be, Si, Ga, La, Fe, and Cu.

<Coating>

The coating according to the present embodiment includes a MAlN layer. In the MAlN layer, M represents a metal element including titanium, chromium, or both. The "coating" coats at least a portion of the substrate (for example, a portion of the rake face and a portion of the flank face) to exhibit a function to improve the cutting tool's various characteristics such as breaking resistance, wear resistance and the like. The coating may coat the entire surface of the substrate. However, even if the substrate is partially uncoated with the coating or the coating is partially different in configuration, such does not depart from the scope of the present embodiment.

The coating may have a thickness of 0.1 µm or more and 2.5 µm or less, 0.3 µm or more and 2.5 µm or less, or 0.5 µm or more and 1.5 µm or less. Note that the thickness of the coating means a total thickness of any layers constituting the coating. A "layer constituting the coating" for example includes the MAlN layer, an intermediate layer, which will be described hereinafter, the underlying and surface layers described above, and other like layers. For example, the thickness of the coating can be determined by measuring any 10 points in a cross-sectional sample of the coating parallel to the direction of a normal to a surface of the substrate with an SEM, and calculating an average value in thickness of the measured 10 points. The measurement is done at a magnification for example of 10,000 times. The same applies when measuring in thickness the MAlN layer, the intermediate layer, the underlying and surface layers, and the like. The SEM is JSM-7600F (trade name) and JSM-7800 (trade name) manufactured by JEOL Ltd., for example.

(MAlN Layer)

The MAlN layer includes crystal grains of $M_xAl_{1-x}N$ in the cubic crystal system. That is, the MAlN layer is a layer including polycrystalline $M_xAl_{1-x}N$. The cubic $M_xAl_{1-x}N$ crystal grains are identified for example by a pattern of a diffraction peak obtained through x-ray diffraction.

In the MAlN layer, M represents a metal element. The metal element M includes titanium, chromium, or both. In one aspect of the present embodiment, the metal element M may further include at least one element selected from the group consisting of boron, silicon, vanadium, zirconium, niobium, molybdenum, hafnium, tantalum, and tungsten (hereinafter also referred to as a "third element"). While boron is normally considered as a semimetal that exhibits an intermediate property between a metallic element and a nonmetallic element, for the MAlN layer of the present embodiment, an element having free electron is regarded as a metal, and boron shall be included in the range of metallic elements.

In one aspect of the present embodiment, the metal element M may be titanium. That is, the coating includes a TiAlN layer as the MAlN layer, and the TiAlN layer may include crystal grains of $Ti_xAl_{1-x}N$ in the cubic crystal system. Note that the TiAlN layer is a layer including polycrystalline $Ti_xAl_{1-x}N$. The cubic $Ti_xAl_{1-x}N$ crystal grains are identified for example by a pattern of a diffraction peak obtained through x-ray diffraction.

In the $M_xAl_{1-x}N$, the metal element M has an atomic ratio x of 0.2 or more and 0.8 or less, and may have an atomic ratio x of 0.4 or more and 0.65 or less. The x can be determined by subjecting the above-described cross-sectional sample to energy dispersive x-ray spectroscopy accompanying an SEM (SEM-EDX) to subject the entire MAlN layer to an elemental analysis. This is done by observing the sample at a magnification for example of 5,000 times. Specifically, any 10 points in the MAlN layer in the cross-sectional sample is each measured to obtain a value of the x, and an average value of such values obtained at the 10 points is defined as x in the MAlN layer. Note that when the metal element M includes a plurality of metal elements, a sum of the atomic ratios of the metal elements will be the atomic ratio x of the metal element M. Further, "any 10 points" are selected from different crystal grains of the MAlN layer. The EDX device is JED-2300 (trade name) manufactured by JEOL Ltd., for example.

When the metal element M includes titanium, an atomic ratio w of the titanium in the $M_xAl_{1-x}N$ may be larger than 0 and equal to 0.8 or less, and may be 0.4 or more and 0.65 or less. Note that when the metal atom M is titanium alone, the atomic ratio x of the metal element M matches the atomic ratio w of titanium as a matter of course.

When the metal element M includes chromium, an atomic ratio y of the chromium in the $M_xAl_{1-x}N$ may be larger than 0 and equal to 0.8 or less, and may be 0.25 or more and 0.5 or less. Note that when the metal atom M is chromium alone, the atomic ratio x of the metal element M matches the atomic ratio y of chromium as a matter of course.

When the metal element M includes the third element, an atomic ratio z of the third element in the $M_xAl_{1-x}N$ may be larger than 0 and equal to 0.8 or less, and may be 0.01 or more and 0.4 or less. Note that when the third element includes a plurality of metal elements, a sum of the atomic ratios of the metal elements will be the atomic ratio z of the third element.

The MAlN layer may have a thickness of 0.1 μm or more and 2.0 μm or less, or may have a thickness of 0.3 μm or more and 1.4 μm or less. When the MAlN layer forms a multilayer structure described hereinafter, the thickness of the MAlN layer means a thickness per layer. The thickness can be measured for example by observing such a cross section as described above of the cutting tool with an SEM at a magnification of 10,000 times.

The MAlN layer may be included in the coating as a single MAlN layer or a plurality of (e.g., 2 to 50) MAlN layers. The MAlN layer may form a multilayer structure in which the MAlN layer and another layer, such as an intermediate layer described hereinafter, are stacked alternately. In one aspect of the present embodiment, the MAlN layer may per se form a multilayer structure.

(Number of Voids in the MAlN Layer)

In the present embodiment, $n_R$ is 3 or less, where $n_R$ represents a number of voids at the rake face in the MAlN layer per 50 μm in length in a cross section of the MAlN layer obtained when the MAlN layer is cut along a plane including a normal to the rake face. In the present embodiment, $n_F$ may be 3 or less, where $n_F$ represents a number of voids at the flank face in the MAlN layer per 50 μm in length in a cross section of the MAlN layer obtained when the MAlN layer is cut along a plane including a normal to the flank face.

In the present embodiment, a "void" means a gap having an area in cross section of $1.0 \times 10^{-4}$ μm$^2$ or more and 0.5 μm$^2$ or less when the MAlN layer is cut. The void may extend in the direction of the thickness of the coating. The present inventors have confirmed in the present embodiment that a void having an area in cross section of less than $1.0 \times 10^{-4}$ μm$^2$ is not formed in a method for manufacturing a cutting tool described hereinafter, or even if it is formed, it is formed in a very small number. That is, a void having an area in cross section of less than $1.0 \times 10^4$ μm$^2$ may be present. The present inventors consider that even if a void having an area in cross section of less than $1.0 \times 10^{-4}$ μm$^2$ should be present, the void cannot be a point at which breaking starts when an impact is repeatedly received during a cutting process. Furthermore, the present inventors have confirmed in the present embodiment that a void having an area in cross section exceeding 0.5 μm$^2$ is not formed in the method for manufacturing a cutting tool described hereinafter. That is, the number of voids having an area in cross section exceeding 0.5 μm$^2$ may be 0.

Figure 6:
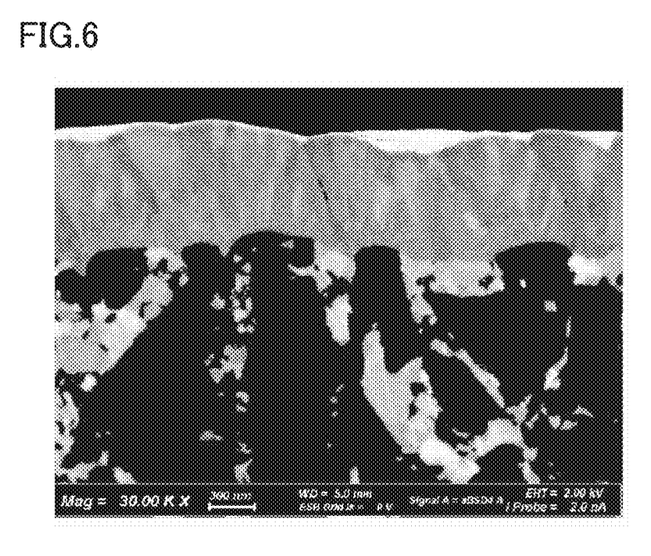
FIG. 6 is an enlarged BSE image of a cross section of the cutting tool according to the present embodiment.
Figure 8:
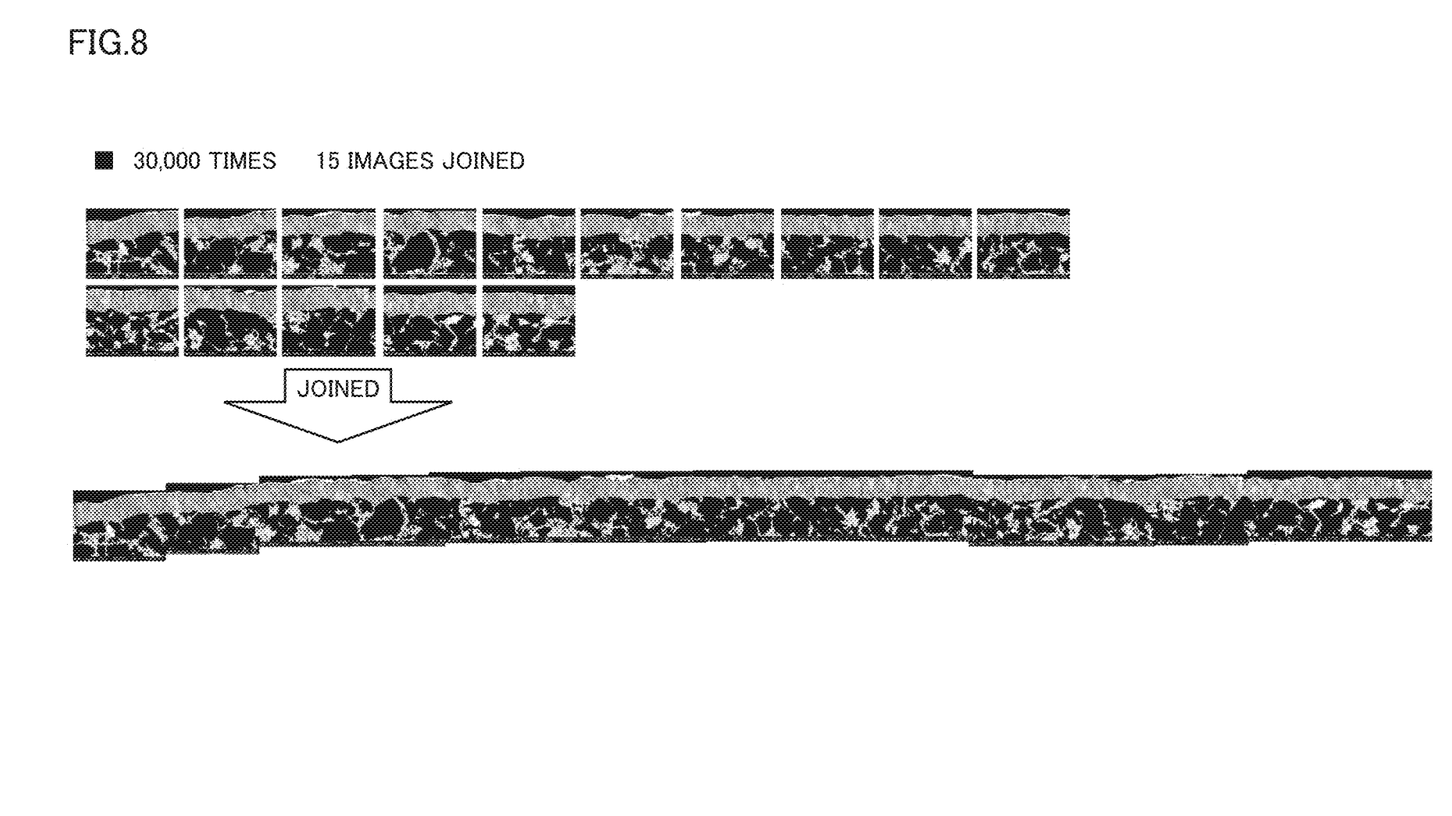
FIG. 8 is an enlarged BSE image of a cross section of the cutting tool according to the present embodiment.
Figure 9:
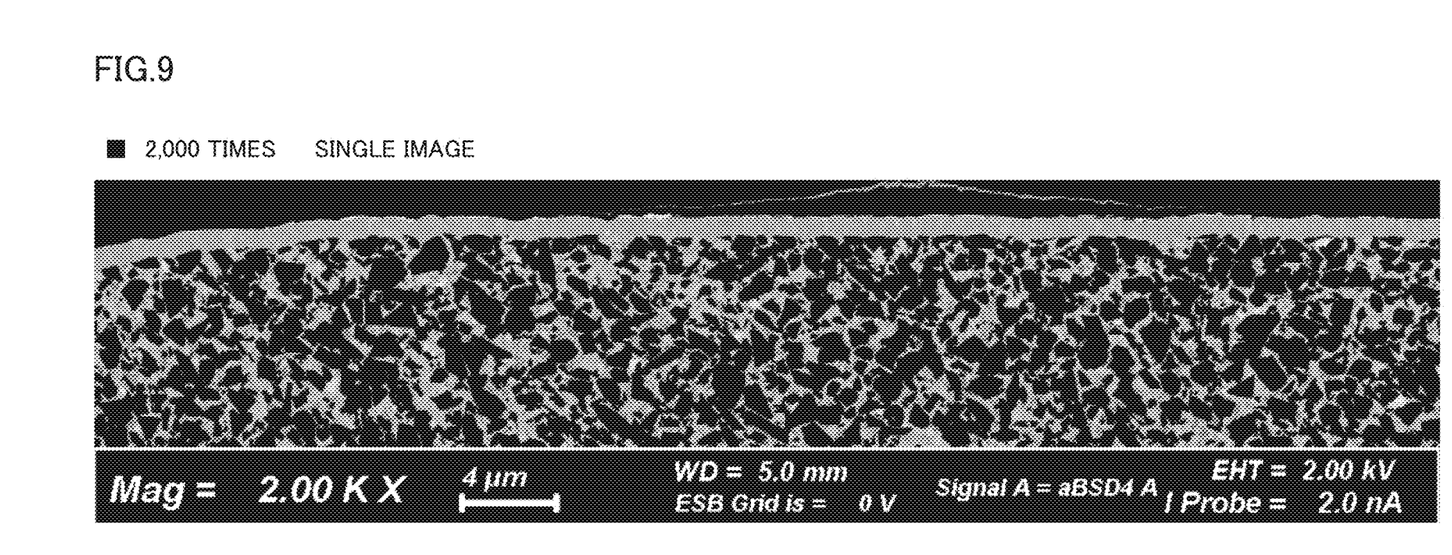
FIG. 9 is an enlarged BSE image of a cross section of the cutting tool according to the present embodiment.

The number of voids is counted through the following procedure: Initially, such a cross section as described above of the cutting tool is observed with a SEM at a magnification of 30,000 times to obtain an SEM image. In doing so, a backscattered electron (BSE) image is obtained so that the MAlN layer is continuously included in a range of a length of 50 μm (a length in a direction perpendicular to the direction of the thickness of the MAlN layer) (for example, see FIG. 6). The number of BSE images to be obtained is not particularly limited insofar as the MAlN layer is included in the range of the length of 50 μm, and it may be one field of view or a plurality of fields of view. When BSE images are obtained in a plurality of fields of view, the BSE images may initially be joined together (see FIGS. 8 and 9 for example) and the number of voids described hereinafter may be counted subsequently. One field of view may have a size for example of 3.7 μm×2.6 μm.

Figure 7:
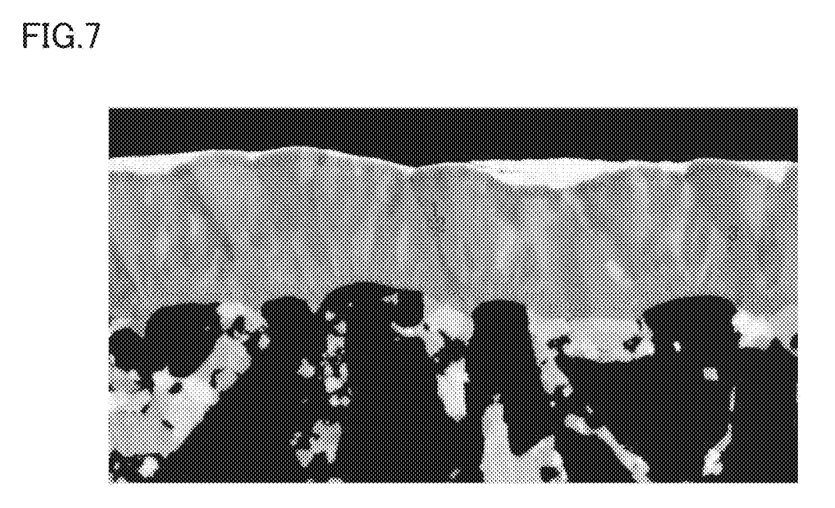
FIG. 7 is an enlarged BSE image of a cross section of the cutting tool according to the present embodiment.

The obtained BSE image is converted into a 256-level monochrome image in a range of the BSE image excluding 30 mm in a vicinity of the substrate and in a vicinity of a film surface (hereinafter, the range may also be referred to as an "evaluation target range"). In the evaluation target range, an 80th level as counted from black is set as a threshold and binarization is performed using image analysis software (for example, "WinROOF" manufactured by Mitani Corporation). Thereafter, a portion isolated by binarization is subjected to a shape analysis, and a portion having an area in cross section of $1.0 \times 10^{-4}$ µm$^2$ or more and 0.5 µm$^2$ or less is counted as a void (for example, see FIG. 7). Note that a void partially outside the evaluation target range is not counted as a void. The present inventors consider that the number of voids is a parameter reflecting a property of the entire MAlN layer. Whether a void may or may not penetrate the MAlN layer of interest, the void is counted as one void. For example, in the SEM image (BSE image) shown in FIG. 6, a light gray layer is the MAlN layer, and a black dot in the layer is a void. In this case, three voids are counted (FIG. 7).

It is believed that a void is formed such that it starts from a surface of the substrate and a void is formed independently in a film structure, and the present inventors consider that a void observed in the MAlN layer in the SEM image of the cross-sectional sample to be any of such voids.

The number of such voids is counted in the "range continuously having a length of 50 µm" at at least three locations and an average value thereof serves as the number of voids.

In principle, the above void counting method is applied to all of the flank face, the rake face, and the cutting edge face (see FIGS. 2 and 3 for example). Note, however, that when the "range continuously having a length of 50 µm" is not ensured at the cutting edge face or the like, the number of voids is determined by counting the number of voids in a range of a maximum length that can be ensured, and converting the number of voids thus counted into that of voids per 50 µm in length. For example, when a range of a maximum length that can be ensured is 20 µm, then, the number of voids per 50 µm in length is calculated by counting the number of voids in the range of the length of 20 µm and multiplying the counted number of voids by 2.5.

When the cutting tool according to the present embodiment further comprises a cutting edge face connecting the rake face and the flank face together, $n_C$ may be 3 of less where $n_C$ represents a number of voids at the cutting edge face in the MAlN layer per 50 µm in length in a cross section of the MAlN layer obtained when the MAlN layer is cut along a plane including a normal to the cutting edge face.

The $n_R$ may be 3 or less, 2 or less, or 1 or less. A void present in the rake face acts as a point at which breaking starts when the void repeatedly receives an impact during a cutting process. In other words, the MAlN layer at the rake face with a reduced number of voids allows enhancement in breaking resistance.

The $n_F$ may be 3 or less, 2 or less, or 1 or less. A void present in the flank face reduces wear resistance against abrasive wear added during a cutting process, and flank wear may progress. In other words, the MAlN layer at the flank face with a reduced number of voids allows enhancement in wear resistance.

The $n_C$ may be 3 or less, 2 or less, or 1 or less. A void present in the cutting edge face acts as a point at which breaking starts when the void repeatedly receives an impact during a cutting process. In other words, the MAlN layer at the cutting edge face with a reduced number of voids allows enhancement in breaking resistance.

In one aspect of the present embodiment, the $n_F$ may be 3 or less, the $n_R$ may be 3 or less, and the $n_C$ may be 3 or less. In another aspect of the present embodiment, the $n_F$ may be 2 or less, the $n_R$ may be 2 or less, and the $n_C$ may be 2 or less.

In another aspect of the present embodiment, the $n_F$ may be 1 or less, the $n_R$ may be 1 or less, and the $n_C$ may be 1 or less.

When a plurality of MAlN layers are included in the coating, at least one of the plurality of MAlN layers satisfying the above-indicated condition for the number of voids suffices. This is because it is believed that an effect of the present disclosure is effected in that MAlN layer.

(Number of Droplets in the MAlN Layer)

In the present embodiment, a number up of droplets at the flank face in the MAlN layer per 50 µm in length in a cross section of the MAlN layer obtained when the MAlN layer is cut along a plane including a normal to the flank face, may be 1 or less, and may be 0.

Figure 10:
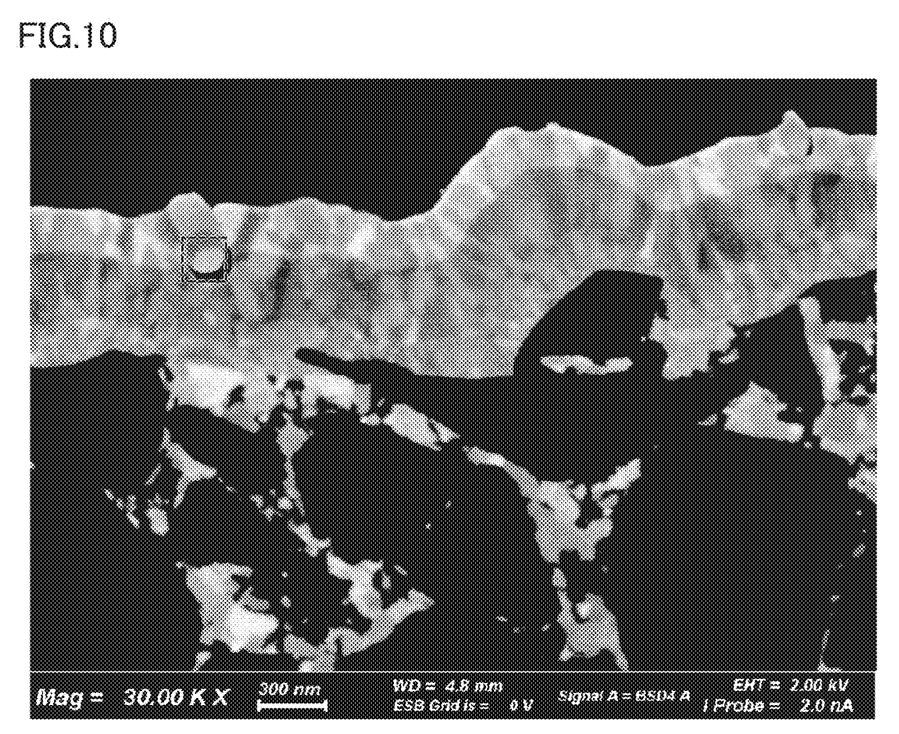
FIG. 10 is an enlarged BSE image of a cross section of the cutting tool according to the present embodiment.

In the present embodiment, a "droplet" means a grain of metal that is present in a layer configuring the coating (for example, the MAlN layer such as a TiAlN layer) and has a predetermined size as will be described hereinafter. The number of droplets is counted in the following method. That is, the above-described cross section of the cutting tool is observed with an SEM at a magnification of 30,000 times to obtain an SEM image. In doing so, the SEM image is obtained so that the MAlN layer is continuously included in a range of a length of 50 µm. The obtained SEM image is visually confirmed, and a white, generally round portion present in the MAlN layer (for example, in a layer indicated in light gray in FIG. 10) is noted. Subsequently, a rectangle circumscribing the generally round portion is drawn, and a length $L_a$ (in µm) of the longer side of the rectangle and a length $L_b$ (in µm) of the shorter side of the rectangle are determined. Note that the rectangle is set such that the longer side or the shorter side is parallel to a major surface of the substrate. In the present embodiment, being "parallel" is an idea which is not limited to being geometrically parallel and also includes being generally parallel. The generally round portion is counted as a droplet when the obtained $L_a$ and $L_b$ satisfy the following condition:

$$0.25 < L_b/L_a \leq 1, \text{ and } 0.1 < L_a.$$

The number of such droplets is counted in a "range continuously having a length of 50 µm" at at least three locations and an average value thereof serves as the number of droplets (Another Layer)

Insofar as an effect which the present embodiment has is not impaired, the coating may further include another layer. Examples of the other layer include an underlying layer provided between the substrate and the MAlN layer and a surface layer provided on the MAlN layer, and an intermediate layer provided between the underlying layer and the MAlN layer or between the MAlN layer and the surface layer. The underlying, surface, and intermediate layers may have their respective compositions identically or differently insofar as the layers are distinguishable from the MAlN layer. The underlying layer may for example be a layer composed of a compound represented by TiN. The surface layer may for example be a layer composed of a compound represented by AlCrN. The intermediate layer may for example be a layer composed of a compound represented by CrN. While the other layer is not particularly limited in thickness insofar as it does not impair an effect of the present embodiment, it has a thickness for example of 0.1 µm or more and 2 µm or less.

<<Method for Manufacturing a Cutting Tool>>

A method for manufacturing a cutting tool according to the present embodiment comprises:

preparing the substrate (hereinafter also referred to as a "first step"); and forming the MAlN layer on the substrate by high-power impulse magnetron sputtering (hereinafter also referred to as a "second step").

High-power impulse magnetron sputtering (HiPIMS) is a type of sputtering. In contrast to normal sputtering, HiPIMS is a deposition method in which power is applied in a pulsed manner and atoms of a target (or a raw material) repelled by discharge are deposited on a substrate or the like.

In HiPIMS, the substrate is set in an apparatus and a target is set as a cathode, and a negative voltage is subsequently applied to the target to cause discharge. In doing so, the apparatus is internally vacuumed and filled with an inert gas (for example, Ar gas). The inert gas in the apparatus is ionized by the discharge, and ions of the inert gas collide with a surface of the target at high speed. This collision repels atoms of the target and thus deposits them on the substrate to form a coating.

Since HiPIMS provides deposition on the principle described above, it is less likely to generate droplets than arc cathode ion plating. Further, the present inventors consider that as HiPIMS is used to deposit the MAlN layer such as a TiAlN layer on the substrate of a cubic boron nitride sintered material, some void starts to be formed from a surface of the substrate and another void is formed independently in a film structure. Thus, it is believed that the voids are attributed to how deposition is provided, and the present inventors consider that such voids are also formed when a layer other than the MAlN layer (for example, the underlying layer, the intermediate layer, and the like) is formed.

<First Step: Step of Preparing the Substrate>

In the first step, a substrate is prepared. As the substrate, for example, a cemented carbide, a cermet, or a cubic boron nitride sintered material is prepared. The substrate may be a commercially available substrate. Furthermore, the substrate may be produced in a general powder metallurgy method. For example, when a general powder metallurgy method is employed to produce a cemented carbide, initially, powdery WC and powdery Co are mixed together using a ball mill or the like to obtain a powdery mixture. The powdery mixture is dried and thereafter molded into a predetermined shape to obtain a molded body. Furthermore, the molded body is sintered to obtain a WC—Co-based cemented carbide (a sintered material). Subsequently, the sintered material is honed or similarly worked as predetermined for a cutting edge to produce a substrate made of a WC—Co-based cemented carbide. Depending on different processing for working for a cutting edge, either a substrate including a cutting edge face (see FIG. 2) or a substrate excluding a cutting edge face (see FIG. 3) can be produced. In the first step, any substrate other than that described above can be prepared insofar as it is conventionally known as a substrate of this type.

<Second Step: Step of Forming the MAlN Layer>

In the second step, the MAlN layer is formed on the substrate by high-power impulse magnetron sputtering. A method therefor for example uses a target of the metal element M (e.g., Ti, Cr, etc.) and Al adjusted in amount depending on the composition of the MAlN layer to be formed.

For example, the second step can be performed as follows: Initially, a chip having a shape as desired is attached as a substrate in a chamber of a deposition apparatus. In doing so, the substrate is disposed to have the flank face to face the target. For example, the substrate is attached to a substrate holder set on a rotary table rotatably provided at the center in the chamber of the deposition apparatus. A bias power supply is connected to the substrate holder. Ar gas and nitrogen gas are introduced while the rotary table is rotated at the center in the chamber. Further, sputtering power (for example having an average power of 10 kW, a frequency of 2,000 to 4,000 Hz, and a pulse width of 50 to 100 μs) is applied to the target for forming the MAlN layer while maintaining the substrate at a temperature of 500 to 800° C., the Ar gas at a pressure of 300 mPa to 600 mPa, the nitrogen gas at a pressure of 300 mPa to 800 mPa, and the bias power supply to have a voltage of −200 to −30 V with a pulse width of 50 to 100 μs. This repels metal atoms from the target for forming the MAlN layer, and once a predetermined period of time has elapsed, applying the sputtering power is stopped, and the MAlN layer is formed on a surface of the substrate. In doing so, the deposition time is adjusted to allow the MAlN layer to have a thickness falling within a predetermined range. In the second step, the MAlN layer may be formed on a portion involved in a cutting process (e.g., rake and flank faces in a vicinity of the cutting edge), and in addition thereto, on a surface of the substrate other than the portion involved in the cutting process.

(Raw Material for MAlN Layer)

In the second step, the MAlN layer is formed of a material including the metal element M and Al. When the MAlN layer is a TiAlN layer, a raw material for the TiAlN layer includes Ti and Al. A raw material for the TiAlN layer is for example a sintered alloy of powdery Ti and Al. When the MAlN layer is a CrAlN layer, a raw material for the CrAlN layer includes Cr and Al. A raw material for the CrAlN layer is for example a sintered alloy of powdery Cr and Al.

In the present embodiment, the reactant gas is appropriately set depending on the composition of the MAlN layer. The reactant gas includes a gaseous mixture of nitrogen gas and an inert gas for example.

In one aspect of the present embodiment, the substrate may have a surface etched before the MAlN layer is deposited. The etching is performed for example under the following conditions:

Etching conditions
Inert gas: Ar gas
Temperature: 500° C.
Pressure: 350 mPa
Voltage: pulsed DC voltage (of 500V, with frequency: 200 kHz)
Etching time: 5 min.

<Another Step>

In the manufacturing method according to the present embodiment, in addition to the above-described steps, the step of forming an underlying layer on the substrate, the step of forming an intermediate layer on the underlying layer or the MAlN layer, the step of forming a surface layer on the MAlN layer, the step of surface treatment, and the like may be performed as appropriate. When another layer, such as the underlying, intermediate, surface, and other layers, is formed, the other layer may be formed in a conventional method. Specifically, for example, the other layer may be formed through physical vapor deposition (PVD) different from HiPIMS. The step of surface treatment includes a surface treatment using a medium with an elastic material carrying powdery diamond, for example.

EXAMPLES

Hereinafter, the present invention will more specifically be described with reference to examples although the present invention is not limited thereto.

<<Manufacturing a Cutting Tool>>
<First Step: Preparing a Substrate>

A substrate of a cemented carbide, a cermet, or a cubic boron nitride sintered material was prepared in the following procedure. Substrates used for samples are shown in Tables 1 and 2. In Tables 1 and 2, a matter of an item indicated across a plurality of samples means that it is identical for the plurality of samples. For example, in Table 1, samples 1 to 4 indicate that they all have a substrate composed of cBN.

(Cemented Carbide)

The substrate of the cemented carbide was produced in a general powder metallurgy method. That is, powdery WC and powdery Co were mixed together using a ball mill or the like to obtain a powdery mixture. The powdery mixture was dried and thereafter molded into a predetermined shape (a shape according to ISO standard CNGA120408) to obtain a molded body. Further, the molded body was sintered to obtain a substrate of a WC—Co-based cemented carbide (a sintered material).

(Cermet)

The substrate of the cermet was produced in a general powder metallurgy method. That is, a powdery raw material for the cermet such as powdery TiC was mixed using a ball mill or the like to obtain a powdery mixture. The powdery mixture was dried and thereafter molded into a predetermined shape (a shape according to ISO standard CNGA120408) to obtain a molded body. Further, the molded body was sintered to obtain the substrate of the cermet (a sintered material).

(Cubic Boron Nitride Sintered Material)

Initially, TiN, Ti and Al as a binder were mixed using a pot made of a cemented carbide and a ball made of a cemented carbide to obtain a powdery raw material for the binder. Subsequently, the powdery raw material for the binder and powdery cubic boron nitride (powdery cBN) were mixed to obtain a powdery mixture. The obtained powdery mixture was introduced into a container of molybdenum. The powdery mixture introduced in the container was sintered for 20 minutes at a temperature of 1400° C. under a pressure of 5 GPa to obtain a cubic boron nitride sintered material. The obtained cubic boron nitride sintered material was processed into a shape of CNGA120408 according to the ISO standard to obtain a substrate of the cubic boron nitride sintered material. For Samples 20 and 21, the substrate included a cutting edge face (see FIG. 2). For Samples 1 to 19 and 22 to 34, the substrate did not include a cutting edge face (see FIG. 3).

(Substrate's Surface Roughness)

The obtained substrates had surface roughness $R_{max}$ conforming to JIS B06012001, and measured with a cut-off value: 0.3 mm, a sampling length: 0.8 mm, and a scanning rate: 0.06 mm/sec, using a contact-type surface roughness tester. A result thereof is shown in Tables 1 and 2.

<Depositing the Coating>
(Second Step: Depositing the MAlN Layer)

On the substrate obtained in the first step, a MAlN layer was formed by HiPIMS to have a composition shown in Table 1 or 2. That is, a plurality of targets were disposed in a deposition apparatus and the substrate was attached to a rotary auxiliary jig provided for the substrate at the center of these targets, and deposition is done through the following procedure. In doing so, the substrate was disposed to have the flank face to face the targets.

For Samples 7 to 20 and 22 to 34, initially, the deposition apparatus was internally vacuumed to 3 mPa, and subsequently heated to around 500° C. Subsequently, Ar gas was introduced. Subsequently, a pulsing DC voltage of 500 V (frequency: 200 kHz) was applied to the substrate in an atmosphere of 350 mPa to generate a plasma of Ar to etch a surface of the substrate (for 5 minutes).

Subsequently, Ar gas and $N_2$ gas were introduced into the deposition apparatus and adjusted to provide a total pressure of 750 mPa (partial pressure: Ar at 350 mPa, and $N_2$ at 400 mPa). Subsequently, a bias voltage of −50 V (with a pulse width of 50 µs) was applied to the substrate and sputtering power (average power: 10 kW, frequency: 3,000 Hz, pulse width: 100 µs) was applied to a cathode (a target metal which is a sintered alloy of the metal M and Al) to sputter the target metal to form a MAlN layer. The MAlN layer was adjusted in thickness by deposition time. Cutting tools for Samples 7 to 20 and 22 to 34 were thus fabricated.

For Samples 1 to 6 and 21, the deposition was performed under the same conditions as described above, except that the bias power supply's voltage and pulse width were changed to be set as indicated below. Cutting tools for Samples 1 to 6 and 21 were thus fabricated (Sample 1)
   bias power supply's voltage: −50 V
   bias power supply's pulse width: 50 µs
(Sample 2)
   bias power supply's voltage: −30 V
   bias power supply's pulse width: 50 µs
(Sample 3)
   bias power supply's voltage: −70 V
   bias power supply's pulse width: 50 µs
(Sample 4)
   bias power supply's voltage: −50 V
   bias power supply's pulse width: 70 µs
(Sample 5)
   bias power supply's voltage: −50 V
   bias power supply's pulse width: 70 µs
(Sample 6)
   bias power supply's voltage: −50 V
   bias power supply's pulse width: 70 µs
(Sample 21)
   bias power supply's voltage: −50 V
   bias power supply's pulse width: 40 µs (Depositing an Underlying Layer and a Surface Layer)

For samples 26 and 28, HiPIMS was employed to form an underlying layer between the substrate and the MAlN layer. Table 2 shows the underlying layer's composition and thickness.

Further, for samples 27 and 28, conventional sputtering was employed to form a surface layer on the MAlN layer. Table 2 shows the surface layer's composition and thickness.

<<Evaluating Characteristics of Cutting Tools>>

Using the cutting tools of samples 1 to 34 manufactured as described above, the cutting tools' characteristics were evaluated as follows:

<Median Diameter $D_{50}$ of Cubic Boron Nitride>

Median diameter $D_{50}$ of cubic boron nitride in the cubic boron nitride sintered material was determined in the above-described cutting method using a scanning electron microscope (SEM). The cubic boron nitride had a median diameter $D_{50}$ of 1 µm.

<Ratio of Cubic Boron Nitride Contained>

The ratio of the cubic boron nitride contained in the cubic boron nitride sintered material of each of Samples 1 to 4, 7 to 21, and 24 to 34 was determined in the method described above. That is, an image of a sample of the cubic boron nitride sintered material in a cross section as described above was captured with an SEM and analyzed. The ratio of the cubic boron nitride contained in the cubic boron nitride sintered material of each of Samples 1 to 4, 7 to 21, and 24 to 34 was 65% by volume. Furthermore, a similar method was employed to measure a ratio of the binder contained in the cubic boron nitride sintered material. The ratio of the binder contained in the cubic boron nitride sintered material of each of Samples 1 to 4, 7 to 21, and 24 to 34 was 35% by volume.

<Measuring Thickness of Each Layer Configuring the Coating>

The coating's constituent layers (i.e., the underlying, MAlN and surface layers) are each measured in thickness by measuring any 10 points in a sample of the coating in a cross section parallel to the direction of a normal to a surface of the substrate with an SEM (manufactured by JEOL Ltd., trade name: JEM-2100F), and calculating an average value of the measured 10 points in thickness. This was done by observing the sample at a magnification of 10,000 times. A result thereof is shown in Tables 1 and 2.

<Measuring Atomic Ratio x of M in $M_xAl_{1-x}N$>

The atomic ratio x of M in $M_xAl_{1-x}N$ was determined in the method described above. Specifically, any 10 points in the MAlN layer in the above-described cross-sectional sample is each measured with an SEM-EDX device to obtain a value of the x, and an average value of such values obtained at the 10 points is defined as x in $M_xAl_{1-x}N$. A result thereof is shown in Tables 1 and 2. In Table 1, for Samples 17 to 19, the "atomic ratio x" is indicated in accordance with an order in which elements are indicated in the "element M" column. For example, the table shows that Sample 17 has an atomic ratio of 0.45 for Ti and an atomic ratio of 0.1 for Cr.

<Measuring Composition of Underlying Layer and Composition of Surface Layer>

The underlying and surface layers' respective compositions were determined by observing the above-described cross-sectional sample with the SEM-EDX device to analyze the entirety of a layer to be analyzed. A result is shown in Table 2.

TABLE 1

| | substrate | | underlying layer | | MAlN layer ($M_xAl_{1-x}N$) | | | surface layer | | Total thickness |
| | | surface | | | | | | | | |
| samples | composition | roughness $R_{max}$(μm) | composition | thickness (μm) | element M | atomic ratio x | thickness (μm) | composition | thickness (μm) | of coating (μm) |
|---|---|---|---|---|---|---|---|---|---|---|
| 1 | cBN | 1.0 | none | — | Ti | 0.5 | 0.8 | none | — | 0.8 |
| 2 | | | | | | | | | | |
| 3 | | | | | | | | | | |
| 4 | | | | | | | | | | |
| 5 | cemented carbide cermet | 1.0 | none | — | Ti | 0.5 | 0.8 | none | — | 0.8 |
| 6 | | | | | | | | | | |
| 7 | cBN | 1.0 | none | — | Ti | 0.1 | 0.8 | none | — | 0.8 |
| 8 | | | | | | 0.3 | | | | |
| 9 | | | | | | 0.5 | | | | |
| 10 | | | | | | 0.7 | | | | |
| 11 | | | | | | 0.9 | | | | |
| 12 | cBN | 1.0 | none | — | Cr | 0.1 | 0.8 | none | — | 0.8 |
| 13 | | | | | | 0.3 | | | | |
| 14 | | | | | | 0.5 | | | | |
| 15 | | | | | | 0.7 | | | | |
| 16 | | | | | | 0.9 | | | | |
| 17 | cBN | 1.0 | none | — | Ti, Cr | 0.45, 0.1 | 0.8 | none | — | 0.8 |
| 18 | | | | | Ti, B | 0.60, 0.05 | | | | |
| 19 | | | | | Ti, Si | 0.60, 0.05 | | | | |

TABLE 2

| | substrate | | underlying layer | | MAlN layer ($M_xAl_{1-x}N$) | | | surface layer | | Total thickness |
| | | surface | | | | | | | | |
| samples | composition | roughness $R_{max}$(μm) | composition | thickness (μm) | element M | atomic ratio x | thickness (μm) | composition | thickness (μm) | of coating (μm) |
|---|---|---|---|---|---|---|---|---|---|---|
| 20 | cBN | 1.0 | none | — | Ti | 0.5 | 0.8 | none | — | 0.8 |
| 21 | | | | | | | | | | |
| 22 | cemented carbide cermet | 1.0 | none | — | Ti | 0.5 | 0.8 | none | — | 0.8 |
| 23 | | | | | | | | | | |
| 24 | cBN | 0.5 | none | — | Ti | 0.5 | 0.8 | none | — | 0.8 |
| 25 | | 1.5 | | | | | | | | |
| 26 | cBN | 1.0 | TiN | 0.2 | Ti | 0.5 | 0.8 | none | — | 1 |
| 27 | | | none | — | | | | AlCrN | 0.1 | 0.9 |
| 28 | | | TiN | 0.2 | | | | AlCrN | 0.1 | 1.1 |
| 29 | cBN | 1.0 | | — | Ti | 0.5 | 0.1 | none | — | 0.1 |
| 30 | | | | | | | 0.5 | | | 0.5 |
| 31 | | | | | | | 0.7 | | | 0.7 |
| 32 | | | | | | | 1.0 | | | 1.0 |
| 33 | | | | | | | 1.2 | | | 1.2 |
| 34 | | | | | | | 2.0 | | | 2.0 |

Determining the Number of Voids

The number of voids in the MAlN layer per 50 µm in length was determined in the method described above. That is, the above-described cross sectional sample was observed with an SEM at a magnification of 30,000 times to obtain an SEM image. In doing so, a backscattered electron (BSE) image was obtained so that the MAlN layer was continuously included in a range of a length of 50 µm (for example, see FIGS. 6 and 8). The obtained BSE image was converted into a 256-level monochrome image in a range of the BSE image excluding 30 nm in a vicinity of the substrate and in a vicinity of a film surface (hereinafter, the range may also be referred to as an "evaluation target range"). In the evaluation target range, an 80th level as counted from black was set as a threshold and binarization was performed using image analysis software ("WinROOF" manufactured by Mitani Corporation). Thereafter, a portion isolated by binarization was subjected to a shape analysis, and a portion having an area in cross section of $1.0 \times 10^{-4}$ µm$^2$ or more and 0.5 µm$^2$ or less was counted as a void (see FIG. 7). Note that a void partially outside the evaluation target range was not counted as a void. The number of voids was counted in each of the flank face, the rake face and the cutting edge face. A result thereof is shown in Tables 3 and 4.

<Determining the Number of Droplets>

The number of droplets in the MAlN layer per 50 µm in length was determined in the method described above. That is, the above-described cross sectional sample was observed with an SEM at a magnification of 30,000 times to obtain an SEM image (for example, see FIG. 10). In doing so, the SEM image was obtained so that the MAlN layer was continuously included in a range of a length of 50 µm. The obtained SEM image was visually confirmed, and the number of droplets in the range continuously having the length of 50 µm was counted. A result thereof is shown in Tables 3 and 4.

TABLE 3

| samples | MAlN layer ($M_xAl_{1-x}N$) | | | | cutting test |
|---|---|---|---|---|---|
| | No. of voids * | | | No. of droplets at flank face $n_D$ | breaking longevity (No. of passes) |
| | flank face $n_F$ | cutting edge face $n_C$ | rake face $n_R$ | | |
| 1 | 2 | — | 2 | 0 | 30 |
| 2 | 4 | — | 2 | 0 | 25 |
| 3 | 2 | — | 4 | 0 | 15 |
| 4 | 4 | — | 4 | 0 | 14 |
| 5 | 4 | — | 4 | 0 | 9 |
| 6 | 4 | — | 4 | 0 | 7 |
| 7 | 4 | — | 2 | 0 | 18 |
| 8 | 2 | — | 2 | 0 | 30 |
| 9 | 2 | — | 2 | 0 | 30 |
| 10 | 2 | — | 2 | 0 | 32 |
| 11 | 4 | — | 2 | 0 | 19 |
| 12 | 4 | — | 2 | 0 | 18 |
| 13 | 2 | — | 2 | 0 | 30 |
| 14 | 2 | — | 2 | 0 | 33 |
| 15 | 2 | — | 2 | 0 | 28 |
| 16 | 4 | — | 2 | 0 | 19 |
| 17 | 2 | — | 2 | 0 | 30 |
| 18 | 2 | — | 2 | 0 | 32 |
| 19 | 2 | — | 2 | 0 | 30 |

* Voids having an area in cross section of $1.0 \times 10^{-4}$ µm$^2$ or more and 0.5 µm$^2$ or less were counted. There was no void found having an area in cross section exceeding 0.5 µm$^2$.

TABLE 4

| samples | MAlN layer ($M_xAl_{1-x}N$) | | | | cutting test |
|---|---|---|---|---|---|
| | No. of voids * | | | No. of droplets at flank face $n_D$ | breaking longevity (No. of passes) |
| | flank face $n_F$ | cutting edge face $n_C$ | rake face $n_R$ | | |
| 20 | 2 | 2 | 2 | 0 | 38 |
| 21 | 2 | 4 | 2 | 0 | 30 |
| 22 | 2 | — | 2 | 0 | 15 |
| 23 | 2 | — | 2 | 0 | 12 |
| 24 | 2 | — | 2 | 0 | 38 |
| 25 | 2 | — | 2 | 0 | 28 |
| 26 | 2 | — | 2 | 0 | 31 |
| 27 | 2 | — | 2 | 0 | 32 |
| 28 | 2 | — | 2 | 0 | 32 |
| 29 | 1 | — | 1 | 0 | 23 |
| 30 | 2 | — | 2 | 0 | 26 |
| 31 | 2 | — | 2 | 0 | 29 |
| 32 | 2 | — | 2 | 0 | 33 |
| 33 | 2 | — | 2 | 0 | 30 |
| 34 | 3 | — | 3 | 0 | 25 |

* Voids having an area in cross section of $1.0 \times 10^{-4}$ µm$^2$ or more and 0.5 µm$^2$ or less were counted. There was no void found having an area in cross section exceeding 0.5 µm$^2$.

<<Cutting Test>>

(Strong Intermittent Cutting Test: Breaking Lifetime)

Cutting tools of samples manufactured as described above (Samples 1 to 34) were used under conditions, as indicated below, to intermittently cut a workpiece. While this is done, the number of passes was counted until the cutting tool was broken. A result thereof is shown in Tables 3 and 4. A sample with a substrate of a cBN sintered material was evaluated as a cutting tool having excellent breaking resistance when the sample attains 20 or more passes. A sample with a substrate of a cemented carbide was evaluated as a cutting tool having excellent breaking resistance when the sample attains 15 or more passes. A sample with a substrate of a cermet was evaluated as a cutting tool having excellent breaking resistance when the sample attains 10 or more passes. In this cutting test, Samples 1, 2, 8 to 10, 13 to 15, and 17 to 34 correspond to examples. Samples 3 to 7, 11, 12, and 16 correspond to comparative examples.

Conditions for Strong Intermittent Cutting Test
  Workpiece: SCr420H, round bar having end face with U groove
  Cutting speed (Vc): 100 m/min.
  Feed rate (f): 0.1 mm/rev.
  Cutting depth (ap): 0.2 mm
  Coolant: dry type From a result of Tables 3 and 4, the cutting tools of the examples (Samples 1, 2, 8 to 10, 13 to 15, and 17 to 34) attained numbers of passes equal to or larger than a reference value before the cutting tools were broken, and thus provided a satisfactory result. In contrast, the cutting tools of the comparative examples (Samples 3 to 7, 11, 12, and 16) attained numbers of passes smaller than reference value before the cutting tools were broken. From the above results, it has been found that the cutting tools of the examples are excellent in breaking resistance.

Thus while embodiments and examples of the present invention have been described, it is also initially planned to combine configurations of the embodiments and examples, as appropriate.

It should be understood that the embodiments and examples disclosed herein have been described for the purpose of illustration only and in a non-restrictive manner in any respect. The scope of the present invention is defined by the terms of the claims, rather than the embodiments and examples described above, and is intended to include any modifications within the meaning and scope equivalent to the terms of the claims.

REFERENCE SIGNS LIST 1a rake face, 1b flank face, 1c cutting edge face, 10 cutting tool, 11 substrate, 12 MAlN layer, 13 underlying layer, 14 surface layer, 20 coating

The invention claimed is:

1. A cutting tool comprising a rake face and a flank face, the cutting tool being composed of a substrate and a coating provided on the substrate,
   the coating including a MAlN layer,
   the MAlN layer including crystal grains of $M_xAl_{1-x}N$ in the cubic crystal system,
   in the $M_xAl_{1-x}N$, a metal element M having an atomic ratio x of 0.2 or more and 0.8 or less,
   in the MAlN layer, M representing a metal element including titanium, chromium, or both,
   $n_R$ being 3 or less, where $n_R$ represents an average number of voids counted at at least three arbitrary locations of the rake face across an entire thickness of the MAlN layer per 50 μm in length in a cross section of the MAlN layer obtained when the MAlN layer is cut along a plane including a normal to the rake face,
   the void having an area in cross section of $1.0 \times 10^{-4}$ μm$^2$ or more and 0.5 μm$^2$ or less.

2. The cutting tool according to claim 1, wherein $n_F$ is 3 or less where $n_F$ represents an average number of voids counted at at least three arbitrary locations of the flank face across an entire thickness of the MAlN layer per 50 μm in length in a cross section of the MAlN layer obtained when the MAlN layer is cut along a plane including a normal to the flank face.

3. The cutting tool according to claim 2, further comprising a cutting edge face connecting the rake face and the flank face together, wherein
   $n_C$ is 3 or less where $n_C$ represents an average number of voids counted at at least three arbitrary locations of the cutting edge face across an entire thickness of the MAlN layer per 50 μm in length in a cross section of the MAlN layer obtained when the MAlN layer is cut along a plane including a normal to the cutting edge face.

4. The cutting tool according to claim 3, wherein the $n_F$ is 3 or less, the $n_R$ is 3 or less, and the $n_C$ is 3 or less.

5. The cutting tool according to claim 1, wherein the metal element M further includes at least one element selected from the group consisting of boron, silicon, vanadium, zirconium, niobium, molybdenum, hafnium, tantalum, and tungsten.

6. The cutting tool according to claim 1, wherein the substrate includes at least one type selected from the group consisting of a cemented carbide, a cermet, a high-speed steel, a ceramic, a cubic boron nitride sintered material, and a diamond sintered material.

7. The cutting tool according to claim 1, wherein the substrate has a surface roughness $R_{max}$ of 1 μm or less.

8. The cutting tool according to claim 1, wherein the coating further includes an underlying layer provided between the substrate and the MAlN layer, and
   the underlying layer is different in composition from the MAlN layer.

9. The cutting tool according to claim 1, wherein the coating further includes a surface layer provided on the MAlN layer, and
   the surface layer is different in composition from the MAlN layer.

10. The cutting tool according to claim 1, wherein the MAlN layer has a thickness of 0.1 μm or more and 2.0 μm or less.

11. The cutting tool according to claim 1, wherein the coating has a thickness of 0.1 μm or more and 2.5 μm or less.

* * * * *